United States Patent Office 3,346,348
Patented Oct. 10, 1967

3,346,348
PREPARATION OF Be(BH$_4$)$_2$·3N$_2$H$_4$
Lz F. Lamoria, Bay City, and Paul F. Reigler, Midland, Mich., assignors to The Dow Chemical Company, Midland, Mich., a corporation of Delaware
No Drawing. Filed Oct. 14, 1963, Ser. No. 316,167
3 Claims. (Cl. 23—358)

ABSTRACT OF THE DISCLOSURE

The invention is a coordination compound of beryllium borohydride and hydrazine corresponding to the empirical formula Be(BH$_4$)$_2$·3N$_2$H$_4$. The process for its preparation by reacting hydrazine and beryllium borohydride in an alkyl ether also is claimed.

This invention relates to a novel coordination compound and more particularly is concerned with a novel coordination compound of beryllium borohydride and hydrazine corresponding to the empirical formula Be(BH$_4$)$_2$·3N$_2$H$_4$ and to a process for its preparation.

This novel compound, because of its low molecular weight oxidation products and general nature, is particularly suitable for use as a rocket fuel component.

Heretofore, the preparation of a coordination compound of beryllium borohydride with hydrazine has not been realized. Prior art teaches that the addition of anhydrous hydrazine to solid beryllium borohydride provides an exothermic reaction usually producing either explosive decomposition or a product which is deficient in hydrogen.

Now, unexpectedly the novel compound corresponding to the empirical formula Be(BH$_4$)$_2$·3N$_2$H$_4$ has been prepared. This novel composition is prepared by adding hydrazine to an ethereal solution of beryllium borohydride.

In accordance with the present process, direct precipitation of the novel compound of the present invention in a smooth, controlled reaction is obtained by adding substantially anhydrous hydrazine to a solution of beryllium borohydride in a substantially anhydrous ether solvent in an inert atmosphere. Conveniently, the reaction is carried out at atmospheric pressure and room temperature. The compound is separated from the residual liquid and dried. Usually the Be(BH$_4$)$_2$·3N$_2$H$_4$ compound is washed with fresh ether and dried under reduced pressure at room temperature.

Ordinarily an alkyl ether is used as solvent and preferably diethyl ether is used as solvent and reaction moderator.

The weight proportions of Be(BH$_4$)$_2$/ether usually employed ranges from about 0.01/100 to about 2/100. These proportions are not limiting however, as either more dilute or more concentrated solutions can be employed. At a maximum, the concentration is such that the reaction of Be(BH$_4$)$_2$ with hydrazine does not proceed in an uncontrolled, exothermic manner.

The amount of anhydrous hydrazine which is slowly added to the Be(BH$_4$)$_2$ solution at a maximum is about 3 moles for each mole of Be(BH$_4$)$_2$ present in the reaction mixture. At higher N$_2$H$_4$/Be(BH$_4$)$_2$ molar ratios, there may be some dissolution of the novel Be(BH$_4$)$_2$·3N$_2$H$_4$ compound in the reaction mass. The minimum amount of hydrazine to be employed is not critical although low yields, based on the Be(BH$_4$)$_2$ reactant are obtained at low N$_2$H$_4$/Be(BH$_4$)$_2$ ratios.

As the hydrazine is introduced into the reaction mixture, the novel beryllium borohydride·trihydrazine compound precipitates almost instantaneously in the reaction vessel. Extended reaction periods therefore are not required.

The Be(BH$_4$)$_2$·3N$_2$H$_4$ product of the present invention has been identified by elemental chemical analysis from which mole ratios of the elements were calculated. These were found to be in close agreement with the theoretical ratios obtained from the empirical formula. Additionally, the compound exhibited a unique crystalline pattern as determined by X-ray diffraction analysis. The compound is substantially insoluble in diethyl ether.

The following example will serve to further illustrate the present invention but is not meant to limit it thereto.

Example

About 1.88 grams (~0.049 gram-mole) of doubly sublimed beryllium borohydride was dissolved in about 150 milliliters of substantially anhydrous diethyl ether in an insert atmosphere box. The solution was agitated. While being stirred, about 3 grams (~0.097 gram-mole) of substantially anhydrous hydrazine was introduced slowly by means of a syringe into the ethereal solution. As the hydrazine contacted the beryllium borohydride solution, a white crystalline product precipitated almost instantaneously. Following the completion of the hydrazine addition, the product was collected by filtering on a medium porosity sintered glass frit. The product was washed twice with diethyl ether, removed from the inert atmosphere box and dried under reduced pressure at about room temperature to remove surface adhering ether.

Chemical elemental analysis of the white crystalline product is summarized in Table I.

TABLE I

| Element | Experimental, percent | Be(BH$_4$)$_2$·3N$_2$H$_4$ Theoretical, percent |
|---|---|---|
| Carbon | 1.36 | |
| Hydrogen | 13.91 | 14.95 |
| Beryllium | 6.12 | 6.68 |
| Boron | 14.15 | 16.05 |
| Nitrogen | 63.40 | 62.32 |

A comparison of the mole ratios of the elements as compared to theoretical for Be(BH$_4$)$_2$·3N$_2$H$_4$ is given in Table II.

TABLE II

| Elements | Mole Ratio | |
|---|---|---|
| | Experimental | Theoretical Be(BH$_4$)$_2$·3N$_2$H$_4$ |
| B/Be | 1.93 | 2.00 |
| H/Be | 19.90 | 20.00 |
| H/B | 10.33 | 10.00 |
| H/N | 2.99 | 3.33 |
| H/Be | 6.00 | 6.66 |
| H/B | 3.00 | 3.46 |

Analysis of the crystalline product by X-ray diffraction gave a unique crystalline pattern. The "d" distances and relative intensities of the characteristic lines for this pattern are presented in Table III.

TABLE III

| d | I/I | d | I/I |
|---|---|---|---|
| 6.70 | 50 | 3.11 | 100 |
| 6.10 | 30 | 2.99 | 5 |
| 5.10 | 10 | 2.34 | 10 |
| 4.18 | 10 | 2.26 | 5 |
| 4.01 | 5 | 2.20 | 10 |
| 3.32 | 5 | 2.14 | 5 |
| 3.20 | 10 | | |

The $Be(BH_4)_2 \cdot N_2H_4$ compound is substantially insoluble in diethyl ether. It exhibited a solubility at room temperature of about 0.2 g. in 3 milliliters of hydrazine.

In a second run carried out by the same procedure and using the same relative proportions of hydrazine and beryllium borohydride the compound was produced by adding hydrazine to a diethyl ether solution of beryllium borohydride having about 0.1 part by weight $Be(BH_4)_2$ per 100 parts by weight of the ether.

In a manner similar to that described for the foregoing example, $Be(BH_4)_2 \cdot 3N_2H_4$ can be prepared by adding hydrazine to a solution of $Be(BH_4)_2$ in dibutyl ether at equimolar proportions of $N_2H_4/Be(BH_4)_2$ employing an ether solution having about 2 parts $Be(BH_4)_2$ per 100 parts of the ether.

Similarly hydrazine can be introduced into a solution of $Be(BH_4)_2$ in di-n-hexyl ether (about 0.01 part by weight $Be(BH_4)_2$ per 100 parts by weight ether) at an $$N_2H_4/Be(BH_4)_2$$

gram-mole ratio of about 3.

Various modifications can be made in the present invention without departing from the spirit or scope thereof for it is understood that we limit ourselves only as defined in the appended claims.

We claim:
1. A beryllium borohydride hydrazine coordination compound corresponding to the empirical formula

$$Be(BH_4)_2 \cdot 3N_2H_4$$

2. A process for preparing a beryllium borohydride hydrazine coordination compound corresponding to the empirical formula $Be(BH_4)_2 \cdot 3N_2H_4$ which comprises;
 (a) dissolving beryllium borohydride in an ether at a weight proportion of $Be(BH_4)_2$/alkyl ether of from about 0.01–2/100,
 (b) introducing hydrazine into the ether solution of $Be(BH_4)_2$ thereby to precipitate a beryllium borohydride hydrazine coordination compound corresponding to the empirical formula $Be(BH_4)_2 \cdot 3N_2H_4$, the amount of hydrazine added to said solution based on the grame-mole ratio of $N_2H_4/Be(BH_4)_2$ being at a maximum about 3, and
 (c) separating the so-precipitated $Be(BH_4)_2 \cdot 3N_2H_4$ from the residual liquid reaction mass.

3. A process for preparing beryllium borohydride trihydrazine coordination compound corresponding to the empirical formula $Be(BH_4)_2 \cdot 3N_2H_4$ which comprises;
 (a) dissolving beryllium borohydride in diethyl ether at a weight ratio of $Be(BH_4)_2/(C_2H_5)_2O$ of from about 0.1 to about 2,
 (b) introducing hydrazine into the diethyl ether solution of $Be(BH_4)_2$ at a gram-mole ratio of $N_2H_4/Be(BH_4)_2$ of about 2 thereby to precipitate the beryllium borohydride trihydrazine coordination compound corresponding to the empirical formula $$Be(BH_4)_2 \cdot 3N_2H_4$$

(c) removing the beryllium borohydride trihydrazine coordination compound from the reaction mass,
 (d) washing said compound with diethyl ether, and
 (e) drying said compound under reduced pressure.

No references cited.

MILTON WEISSMAN, *Primary Examiner.*

BENJAMIN R. PADGETT, *Examiner.*

A. J. STEINER, *Assistant Examiner.*